United States Patent
LeBlanc

(10) Patent No.: US 8,553,100 B2
(45) Date of Patent: Oct. 8, 2013

(54) SPOTLIGHT WITH INTEGRAL LOW LUX VIDEO CAMERA SYSTEM

(75) Inventor: Kenneth J. LeBlanc, Gloucester, MA (US)

(73) Assignee: Xylem IP Holdings LLC, White Plains, NY (US)

( * ) Notice: Subject to any disclaimer, the term of this patent is extended or adjusted under 35 U.S.C. 154(b) by 957 days.

(21) Appl. No.: 11/507,927

(22) Filed: Aug. 21, 2006

(65) Prior Publication Data

US 2008/0043098 A1  Feb. 21, 2008

(51) Int. Cl.
*H04N 5/225* (2006.01)

(52) U.S. Cl.
USPC ..................... 348/211.99; 348/143

(58) Field of Classification Search
USPC ............... 348/211.99, 143, 113, 148, 207.99
See application file for complete search history.

(56) References Cited

U.S. PATENT DOCUMENTS

| | | | |
|---|---|---|---|
| 4,918,473 A * | 4/1990 | Blackshear | 396/427 |
| 5,315,296 A | 5/1994 | Kaiser et al. | |
| 5,751,344 A * | 5/1998 | Schnee | 348/113 |
| 6,484,456 B1 | 11/2002 | Featherstone et al. | |
| 6,611,200 B2 | 8/2003 | Pressnall et al. | |
| 2003/0047683 A1 | 3/2003 | Kaushall | |
| 2003/0123752 A1 | 7/2003 | Ishii et al. | |
| 2005/0269481 A1 | 12/2005 | David et al. | |
| 2006/0018513 A1 | 1/2006 | Sogawa | |
| 2006/0072914 A1 * | 4/2006 | Arai et al. | 396/106 |

FOREIGN PATENT DOCUMENTS

| | | |
|---|---|---|
| DE | 10060734 A1 | 6/2002 |
| JP | 9154046 A | 6/1997 |

OTHER PUBLICATIONS

PCT/US07/18213 International Search Report mailed Jul. 8, 2008.

* cited by examiner

*Primary Examiner* — Tuan Ho

(57) ABSTRACT

The invention provides a searchlight device for a recreational boat or other suitable vehicle, vessel or device, featuring a housing for mounting on the recreational boat or other suitable vehicle, vessel or device; a light arranged in the housing, responsive to a light control signal, for projecting bright illuminating light; and a low lux video camera also arranged in the housing, responsive to images in near total darkness, for providing a video camera signal containing information about the images in near total darkness, for allowing close quarter maneuvering in dim light without the need to activate the bright illuminating light so that an operator of the vehicle, vessel or other suitable device may operate safely while maintaining night vision and not impairing the vision of nearby vehicle, vessel or other suitable device.

22 Claims, 3 Drawing Sheets

The Basic Invention

Spotlight With Integral Low Light Video System

FIG. 1: The Basic Invention

FIG. 2: Spotlight With Integral Low Light Video System

SPOTLIGHT WITH INTEGRAL LOW LUX VIDEO CAMERA SYSTEM

BACKGROUND OF THE INVENTION

1. Technical Field

The present invention generally relates to a spotlight or searchlight; and more particularly to a spotlight or searchlight having an integral low lux video camera system for a recreational boat or other suitable vehicle, vessel or device.

2. Description of Related Problem

Some different lighting systems are known in the art.

For example, U.S. Pat. No. 6,611,200 discloses a lighting/camera system having a spotlight covered by an near infrared (NIR) filter, a zoom lens arranged on a standard video camera, and a standard camera monitor; while U.S. Pat. No. 6,484,456 discloses an extendible mast and light bar assembly for attaching to a vehicle rooftop; and DE 100 60 734 A1 discloses a spotlight, camera and control system for a vehicle, where the camera and control system cooperate to keep the spotlight centered on signs being spotted on the side of the road. See also JP 9154046, which discloses another type of spotlight device. However, none of these devices provide a spotlight with integral video camera and console display system capable of producing bright color images in near total darkness. In view of this, there is a need in the recreational boating market to provide such a spotlight.

SUMMARY OF THE INVENTION

In its broadest sense, the present invention provides a new and unique searchlight device for a recreational boat or other suitable vehicle, vessel or device. The searchlight device features a housing for mounting on the recreational boat or other suitable vehicle, vessel or device; a light arranged in the housing for projecting a bright illuminating light; and a low lux video camera also arranged in the housing, responsive to images in near total darkness, for providing a video camera signal containing information about the images in near total darkness, for allowing close quarter maneuvering in dim light without the need to activate the bright illuminating light so that an operator of the vehicle, vessel or other suitable device may operate safely while maintaining night vision and not impairing the vision of nearby vehicle, vessel or other suitable device. In effect, the searchlight device takes the form of a combined spotlight and integral low lux video camera that has a substantially higher light gathering capability that the human eye.

The searchlight may also include a video monitor, responsive the video camera signal, for providing a video monitor signal containing information about the images in near total darkness for viewing by the operator.

Other features of the searchlight device include: a console mounted controller for controlling various functions including bulb and camera activation, and/or movement of a spotlight in the vertical and horizontal planes; the "on/off" of the video camera and a bulb can be activated independently; the movement of the video camera and bulb is concurrent via rotational movement of a light head; the video camera has a wide angle to telephoto or fixed focal length design; the video camera has a low light video lens and PC board assembly; and the light system is powered by 12 or 24 VDC.

In effect, the present invention provides a spotlight in combination with an integral low lux video camera connected to a video monitor. Control of the various functions of the searchlight such as bulb and camera activation, as well as movement of the light in the vertical and horizontal planes, is accomplished by a console mounted "controller". The "on/off" of the camera and bulb (halogen, xenon, LED) can be activated independently. Movement of the bulb and camera is concurrent via rotational movement of the light head. The camera can be color or black and white, although color is preferred to properly identify color-based navigation lights and aids to navigation. The camera lens can be wide angle to telephoto or a fixed focal length design. The system is powered by 12 or 24 VDC.

The whole purpose of the present invention is to provide the recreational boating market with a spotlight with integral video camera and console display system capable of producing bright images in near total darkness. Visibility at night on the water is enhanced greatly using a low lux video camera system with a far higher light gathering capability than the human eye. Night viewing distances are extended greatly. The video display of objects illuminated by the spotlight or illuminated by low levels of ambient light show fine detail not visible to the unaided human eye. Close quarter maneuvers in dim lighting can be done without the need to activate the spotlight, thereby allowing the helmsman to operate safely while maintaining his night vision and not impairing the vision of nearby boaters.

Another one of the benefits of this system is that aids to navigation (which always have or emit a specific color) are easier to see at greater distances on the water which provides a greater margin of safety for the boater.

The foregoing and other objects, features and advantages of the present invention will become more apparent in light of the following detailed description of exemplary embodiments thereof.

BRIEF DESCRIPTION OF THE DRAWING

The drawing is not drawn to scale and includes the following Figures.

BEST MODE FOR CARRYING OUT THE INVENTION

Figure 1:
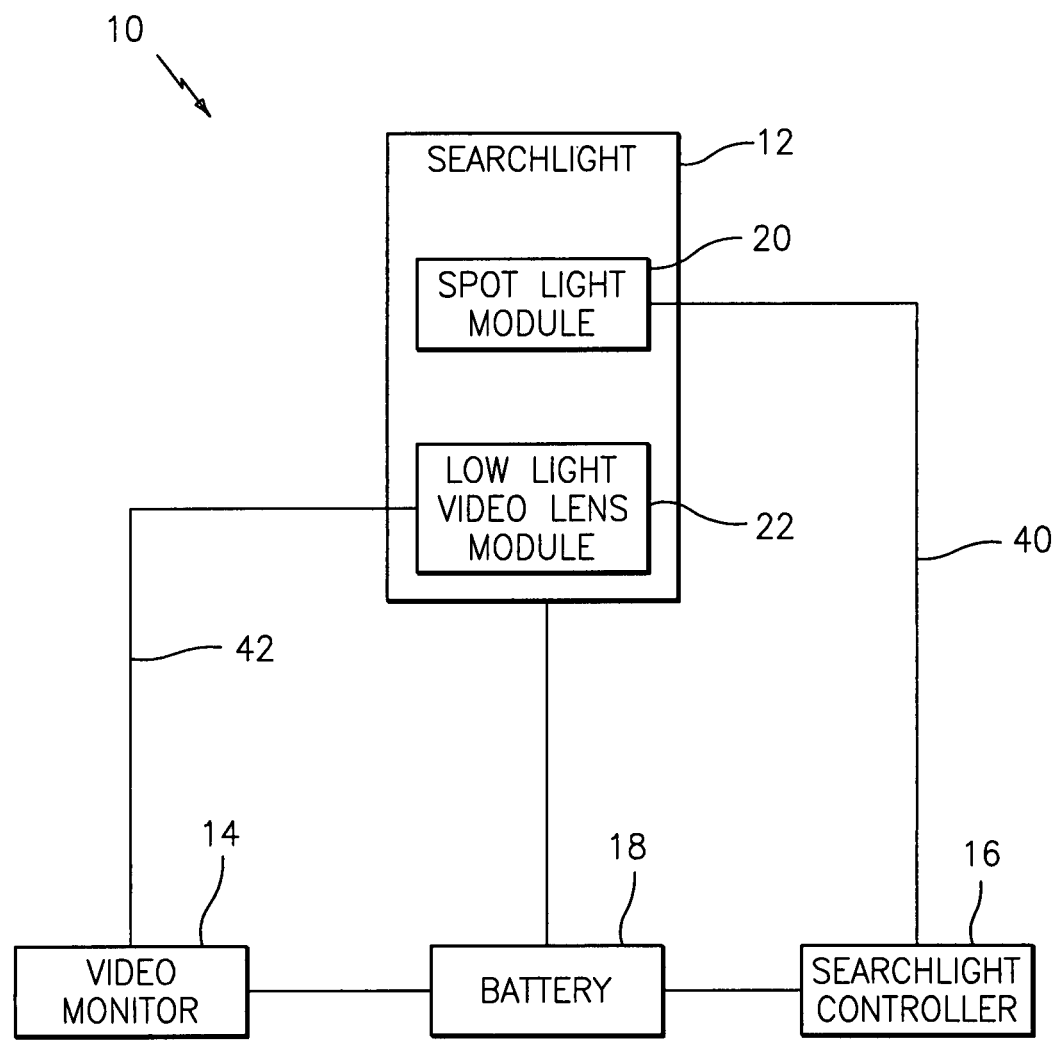
FIG. 1 show a block diagram of a basic searchlight device according to the present invention.

FIG. 1 shows, by way of example, a searchlight device generally indicated as 10 according to the present invention, having a searchlight 12, a video monitor 14, a searchlight controller 16 and a power source 18 in the form of a battery for powering the aforementioned elements.

Figure 2:
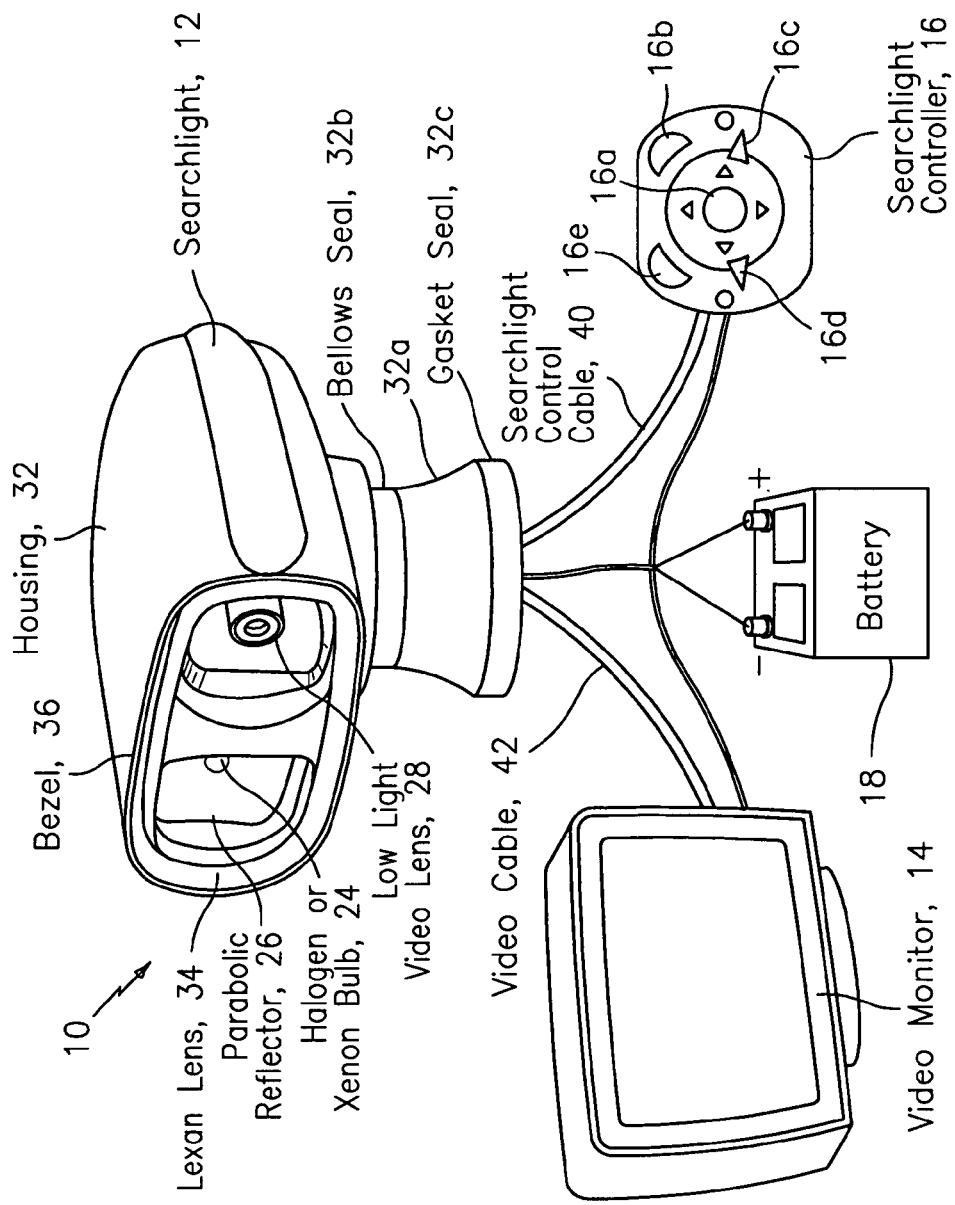
FIG. 2 shows a diagram of one embodiment of the present invention in the form of a spotlight with an integral low light video system.
Figure 3:
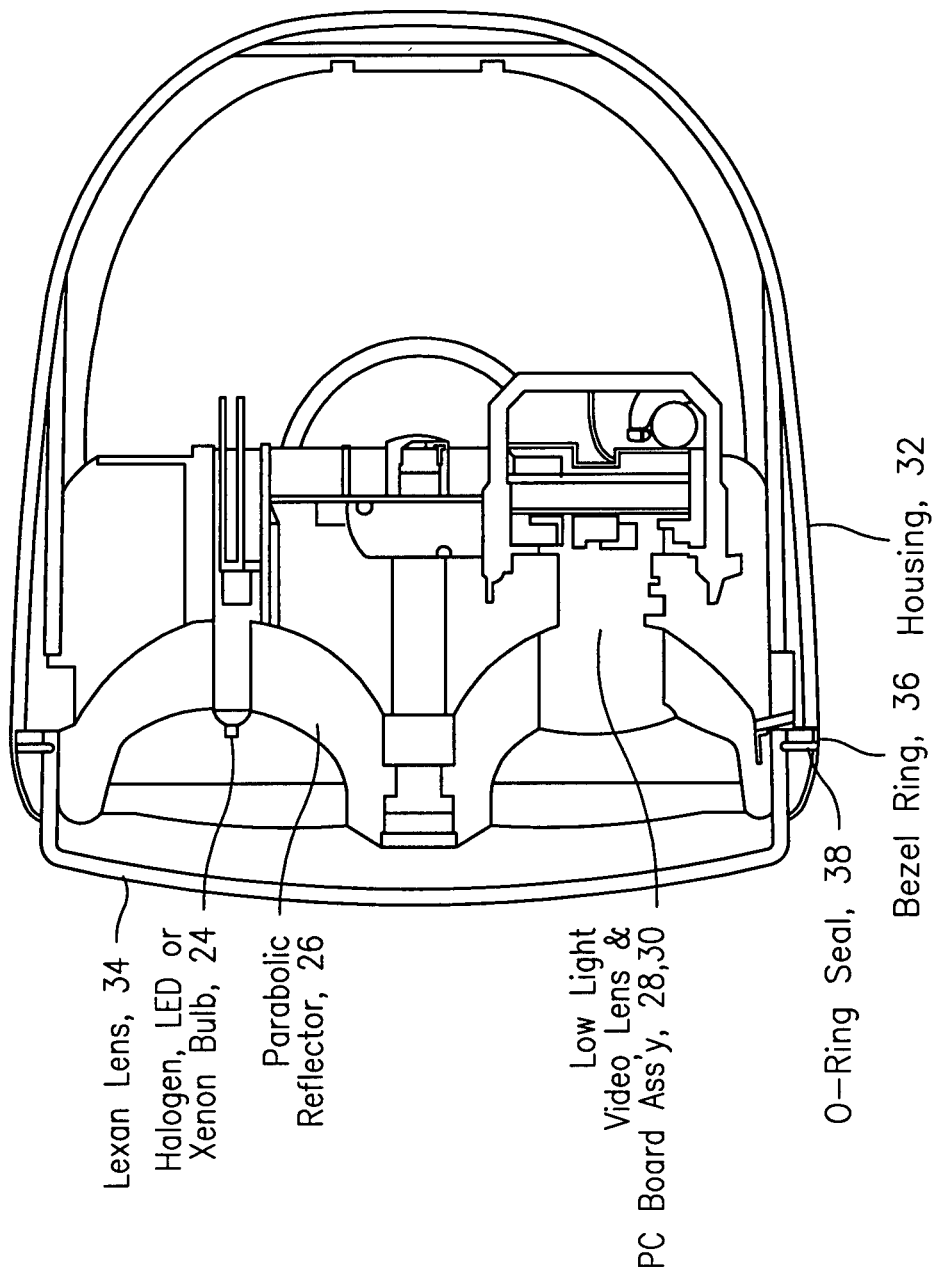
FIG. 3 shows a cross-section of a searchlight that forms part of the diagram of the spotlight with an integral low light video system shown in FIG. 2.

The searchlight 10 includes a spotlight module 20 and a low light video lens module 22. The spotlight module 20 includes a halogen or xenon bulb 24 and a parabolic reflector 26 as shown in FIGS. 2 and 3. The low light video lens module 22 includes a low light video lens 28 (FIG. 2) and a PC board assembly 30 (FIG. 3). As shown in FIG. 3, the searchlight 10 also includes a housing 32 and a lexan lens 34 coupled together by a bezel ring 36 and sealed by an O-ring seal 38. The housing 32 is for mounting the searchlight 12 on the recreational boat or other suitable vehicle, vessel or device, and includes a base 32a, a bellows seal 32b and a gasket seal 32c, as shown.

A searchlight control cable 40 couples the spotlight module 20 and the searchlight controller 16, and a video cable 42 couples the video monitor 14 and the PC board assembly 30 (FIG. 3) of the low light video lens module 22.

By way of example, the searchlight controller 16 may includes a joystick 16*a* and/or a plurality of keys 16*b*, 16*c*, 16*d*, 16*e* for commanding various functions for the searchlight. The reader is referred to patent application Ser. No. 11/255,591, filed 21 Oct. 2005, which is hereby incorporated by reference, for a detailed description of such commands. Consistent with that shown and described therein, the joystick 16*a* may take the form of a two-speed joystick and the keys may control the following functionality: turning the searchlight on/off, switching between searchlight/spotlight modes, activating SOS signalling, moving the searchlight up/down, sweeping the searchlight back and forth, moving the searchlight diagonally up/down and back and forth. The spotlight module 20 may be adapted and/or configured for providing such functionality in relation to movement of the halogen or xenon bulb 24 and/or parabolic reflector 26. In addition, the scope of the invention is not intended to be limited to any particular type or kind of searchlight controller commands either now known or later developed in the future.

In operation, the halogen or xenon bulb 24 is arranged in the housing 32 for projecting a bright illuminating light in response to searchlight controller signals from the searchlight controller 16 along the searchlight controller cable 40. The low lux video lens/camera 28 is also arranged in the housing 32, responds to images in near total darkness, and provides a video camera signal containing information about the images in near total darkness, for allowing close quarter maneuvering in dim light without the need to activate the bright illuminating light so that an operator of the vehicle, vessel or other suitable device may operate safely while maintaining night vision and not impairing the vision of nearby vehicle, vessel or other suitable device. In effect, the searchlight device takes the form of a combined spotlight and integral low lux video camera that has a substantially higher light gathering capability that the human eye.

Such a video monitor like element 14, low lux video lens/camera like element 28 and PC board assembly like element 30 are known in the art and may be adapted to implemented the functionality according to the present invention, so the scope of the invention is not intended to be limited to any particular type of kind thereof. A person skilled in the art would be able to adapt such known elements without undue experimentation to achieve the functionality disclosed herein. For example, the functionality of such a PC board assembly 30 may be implemented using hardware, software, firmware, or a combination thereof, although the scope of the invention is not intended to be limited to any particular embodiment thereof. In a typical software implementation, such a module would be one or more microprocessor-based architectures having a microprocessor, a random access memory (RAM), a read only memory (ROM), input/output devices and control, data and address buses connecting the same. A person skilled in the art would be able to program such a microprocessor-based implementation to perform the functionality described herein without undue experimentation. The scope of the invention is not intended to be limited to any particular implementation using technology known or later developed in the future.

The Scope of the Invention

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

What is claimed is:

1. A searchlight device for a recreational boat or other suitable vehicle, vessel or device, comprising:
a searchlight having a housing for mounting on a recreational boat or other suitable vehicle, vessel or device, the housing having a light module configured to provide light and also having a low light video lens module with an integral low lux video camera configured to respond to images in near total darkness and provide an integral low lux video camera module signal containing information about the same, the light module and the integral low lux video camera being activated independently to turn on/off by user commands, the searchlight being configured to respond to a searchlight controller signal and to move the searchlight in order for the integral low lux video camera to receive the images in near total darkness with the light module off, the movement of the light module and the integral low lux video camera being concurrent via a rotational movement of the housing; and
a searchlight controller configured to respond to the user commands containing information about receiving the images in near total darkness and configured to provide the searchlight controller signal containing information to move the searchlight in order to receive the images in near total darkness with the light module off, so as to allow close quarter maneuvering in near total darkness without the need to activate the light module so that an operator of the recreational boat, vehicle, vessel or other suitable device may operate safely while maintaining night vision and not impairing the vision of a nearby vehicle, vessel or other suitable device.

2. A searchlight device according to claim 1, wherein the searchlight device further comprises:
a video monitor, responsive the video camera signal, for providing a video monitor signal containing information about the images in near total darkness for viewing by the operator.

3. A searchlight device according to claim 1, wherein the integral low lux video camera has a substantially higher light gathering capability that the human eye.

4. A searchlight device according to claim 1, wherein the searchlight device further comprises a console mounted controller for controlling various functions including bulb and camera activation, and/or movement of a spotlight in the vertical and horizontal planes.

5. A searchlight device according to claim 1, wherein the "on/off" of the video camera and a bulb can be activated independently.

6. A searchlight device according to claim 1, wherein the movement of the integral low lux video camera and bulb is concurrent via rotational movement of a light head.

7. A searchlight device according to claim 1, wherein the integral low lux video camera has a wide angle to telephoto or fixed focal length design.

8. A searchlight device according to claim 1, wherein the light module is configured as a spotlight.

9. A searchlight device according to claim 1, wherein the integral low lux video camera has a low light video lens and PC board assembly.

10. A searchlight device according to claim 1, wherein the searchlight is powered by 12 or 24 VDC.

11. A searchlight device according to claim 1, wherein the searchlight is configured to respond to the searchlight controller signal and to move in the vertical and horizontal planes, including sweeping the searchlight back and forth and moving the searchlight diagonally up/down and back and forth.

12. A searchlight device for a recreational boat or other suitable vehicle, vessel or device, comprising:
   a searchlight having a housing for mounting on a recreational boat or other suitable vehicle, vessel or device, the housing having a light module configured to provide light and also having a low light video lens module with an integral low lux video camera configured to respond to images in near total darkness and provide an integral low lux video camera module signal containing information about the same, the light module and the integral low lux video camera being activated independently to turn on/off by user commands from an operator, the searchlight being configured to respond to a searchlight controller signal and to move the searchlight in the vertical and horizontal planes, including sweeping the searchlight back and forth and moving the searchlight diagonally up/down and back and forth, in order for the integral low lux video camera to receive the images in near total darkness with the light module off, the movement of the light module and the integral low lux video camera being concurrent via a rotational movement of the housing;
   a console mounted searchlight controller configured to respond to the user commands containing information about receiving the images in near total darkness and configured to provide the searchlight controller signal containing information to move the searchlight in the vertical and horizontal planes in order to receive the images in near total darkness with the light module off, so as to allow close quarter maneuvering in near total darkness without the need to activate the light module so that an operator of the recreational boat, vehicle, vessel or other suitable device may operate safely while maintaining night vision and not impairing the vision of a nearby vehicle, vessel or other suitable device; and
   a video monitor configured to respond to the video camera signal, and to provide a video monitor signal containing information about the images in near total darkness for viewing by the operator.

13. A searchlight device according to claim 12, wherein the integral low lux video camera has a substantially higher light gathering capability that the human eye.

14. A searchlight device according to claim 12, wherein the integral low lux video camera has a wide angle to telephoto or fixed focal length design.

15. A searchlight device according to claim 12, wherein the light module is configured as a spotlight.

16. A searchlight device according to claim 12, wherein the integral low lux video camera has a low light video lens and PC board assembly.

17. A searchlight device according to claim 12, wherein the searchlight is powered by 12 or 24 VDC.

18. A recreational boat or other suitable vessel having a searchlight, the searchlight comprising:
   a searchlight having a housing for mounting on a recreational boat or other suitable vehicle, vessel or device, the housing having a light module configured to provide light and also having a low light video lens module with an integral low lux video camera configured to respond to images in near total darkness and provide an integral low lux video camera module signal containing information about the same, the light module and the integral low lux video camera being activated independently to turn on/off by user commands from an operator, the searchlight being configured to respond to a searchlight controller signal and to move the searchlight in the vertical and horizontal planes, including sweeping the searchlight back and forth and moving the searchlight diagonally up/down and back and forth, in order for the integral low lux video camera to receive the images in near total darkness with the light module off, the movement of the light module and the integral low lux video camera being concurrent via a rotational movement of the housing;
   a console mounted searchlight controller configured to respond to the user commands containing information about receiving the images in near total darkness and configured to provide the searchlight controller signal containing information to move the searchlight in the vertical and horizontal planes in order to receive the images in near total darkness with the light module off, so as to allow close quarter maneuvering in near total darkness without the need to activate the light module so that an operator of the recreational boat, vehicle, vessel or other suitable device may operate safely while maintaining night vision and not impairing the vision of a nearby vehicle, vessel or other suitable device; and
   a video monitor configured to respond to the video camera signal, and to provide a video monitor signal containing information about the images in near total darkness for viewing by the operator.

19. A recreational boat or other suitable vessel according to claim 18, wherein the integral low lux video camera has a substantially higher light gathering capability that the human eye.

20. A recreational boat or other suitable vessel according to claim 18, wherein the integral low lux video camera has a wide angle to telephoto or fixed focal length design.

21. A recreational boat or other suitable vessel according to claim 18, wherein the light module is configured as a spotlight.

22. A recreational boat or other suitable vessel according to claim 18, wherein the integral low lux video camera has a low light video lens and PC board assembly.

* * * * *